(12) United States Patent
Osterchill et al.

(10) Patent No.: US 8,943,645 B2
(45) Date of Patent: Feb. 3, 2015

(54) HAND-HELD BLOWER DEVICES WITH VACUUM FUNCTION

(75) Inventors: Jeff Osterchill, Texarkana, TX (US);
Timothy Choate, Texarkana, TX (US);
Danny Sparks, New Boston, TX (US);
Mosheer Abdelgalil, Texarkana, TX (US); Anna Maria Abdelgalil, legal representative, Texarkana, TX (US)

(73) Assignee: Husqvarna AB, Huskvarna (SE)

( * ) Notice: Subject to any disclaimer, the term of this patent is extended or adjusted under 35 U.S.C. 154(b) by 22 days.

(21) Appl. No.: 13/824,456

(22) PCT Filed: Oct. 8, 2010

(86) PCT No.: PCT/US2010/052000
§ 371 (c)(1),
(2), (4) Date: Mar. 18, 2013

(87) PCT Pub. No.: WO2012/047228
PCT Pub. Date: Apr. 12, 2012

(65) Prior Publication Data
US 2013/0276260 A1    Oct. 24, 2013

(51) Int. Cl.
*A47L 5/24*   (2006.01)
*A47L 5/14*   (2006.01)
*A01G 1/12*   (2006.01)
*A47L 9/08*   (2006.01)

(52) U.S. Cl.
CPC . *A47L 5/14* (2013.01); *A01G 1/125* (2013.01); *A47L 9/08* (2013.01)
USPC .............................. 15/330; 15/344

(58) Field of Classification Search
CPC .................... A47L 5/14; A47L 9/08
USPC ...................................... 15/330, 344
IPC .......................................... A47L 9/08
See application file for complete search history.

(56) References Cited

U.S. PATENT DOCUMENTS

| 2,416,419 A | 2/1947 | Pickford |
| 2,825,924 A | 3/1958 | Humphrey |
| 5,003,662 A | 4/1991 | Everts |

(Continued)

OTHER PUBLICATIONS

International Search Report and Written Opinion of PCT/US2010/052000 mailed Nov. 26, 2010.

(Continued)

*Primary Examiner* — David Redding
(74) *Attorney, Agent, or Firm* — Nelson Mullins Riley & Scarborough LLP (57) ABSTRACT

Hand-held blower devices with vacuum function are provided. In this regard, a representative device includes: a housing defining an interior, an intake and an exhaust; an impeller mounted within the interior and being operative to rotate such that air is drawn into the interior through the intake and expelled from the interior through the exhaust; a locking mechanism mounted to the housing, the locking mechanism being movable between an unlocked position and a locked position; and a vacuum tube assembly having an inlet end and an outlet end and defining an air passageway between the inlet end and the outlet end, the outlet end being operative to engage the intake of the housing for the vacuum mode of operation; the locking mechanism being operative to interface with the vacuum tube assembly to retain the outlet end of the vacuum tube assembly in engagement with the intake of the housing for the vacuum mode of operation.

14 Claims, 9 Drawing Sheets

(56) References Cited

U.S. PATENT DOCUMENTS

| | | |
|---|---|---|
| 5,222,275 A | 6/1993 | Baker et al. |
| 5,638,574 A | 6/1997 | Haupt et al. |
| 5,692,262 A | 12/1997 | Haupt et al. |
| 5,933,912 A | 8/1999 | Karr et al. |
| 6,305,909 B1 | 10/2001 | Jankowski et al. |
| 6,442,790 B1 | 9/2002 | Svoboda et al. |
| 6,640,384 B2 | 11/2003 | Sanders et al. |
| 2003/0066159 A1 | 4/2003 | Sanders et al. |

OTHER PUBLICATIONS

Chapter I International Preliminary Report on Patentability of PCT/US2010/052000 mailed Apr. 9, 2013.

FIG. 14

HAND-HELD BLOWER DEVICES WITH VACUUM FUNCTION

BACKGROUND

1. Technical Field

The disclosure generally relates to outdoor lawn and garden appliances.

2. Description of the Related Art

Hand-held blowers (sometimes referred to as leaf blowers) often provide vacuum capability. Typically, such a blower will incorporate a vacuum tube assembly that facilitates the use of the vacuum capability and which allows for the vacuuming of leaves and other debris without requiring the user to bend over as far as would be required if the vacuum tube assembly were not used. Notably, various methods have been used for attaching a vacuum tube assembly to the main body of a blower with varying degrees of success.

SUMMARY

Hand-held blower devices with vacuum function are provided. In this regard, an exemplary embodiment of a device comprises: a housing defining an interior, an intake and an exhaust; an impeller mounted within the interior and being operative to rotate such that air is drawn into the interior through the intake and expelled from the interior through the exhaust; a locking mechanism mounted to the housing, the locking mechanism being movable between an unlocked position and a locked position; and a vacuum tube assembly having an inlet end and an outlet end and defining an air passageway between the inlet end and the outlet end, the outlet end being operative to engage the intake of the housing for the vacuum mode of operation; the locking mechanism being operative to interface with the vacuum tube assembly to retain the outlet end of the vacuum tube assembly in engagement with the intake of the housing for the vacuum mode of operation.

Another exemplary embodiment of a device comprises: a housing defining an interior, an intake and an exhaust; an impeller mounted within the interior and being operative to rotate such that air is drawn into the interior through the intake and expelled from the interior through the exhaust; a vacuum tube assembly having an inlet end and an outlet end and defining an air passageway between the inlet end and the outlet end, the outlet end being operative to engage the intake of the housing for the vacuum mode of operation; a door pivotable between a closed position, in which the door covers the intake for a blower mode of operation, and an open position, in which the door is positioned for a vacuum mode of operation; a first latching member positioned on the housing; and a second latching member positioned on the housing; the door having a latch operative to selectively retain the door in the open position for the vacuum mode of operation by engaging the first latching member and to selectively retain the door in the closed position for the blower mode of operation by engaging the second latching member Other devices, systems, methods, features and/or advantages of this disclosure will be or may become apparent to one with skill in the art upon examination of the following drawings and detailed description. It is intended that all such additional devices, systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Hand-held blower devices with vacuum function are provided, several exemplary embodiments of which will be described in detail. In some embodiments, a door is mounted to a main body (or housing) of the device that can be pivoted between a closed position, in which the door covers an intake of the device, and an open position, in which the door is retained away from the intake. Notably, the closed position of the door is associated with a blower mode of operation and the open position is associated with a vacuum mode of operation. In some embodiments, optional retention of the door in the open and/or closed positions is provided by various provisioning, such as those involving biasing members and locking features, among others.

Figure 1:
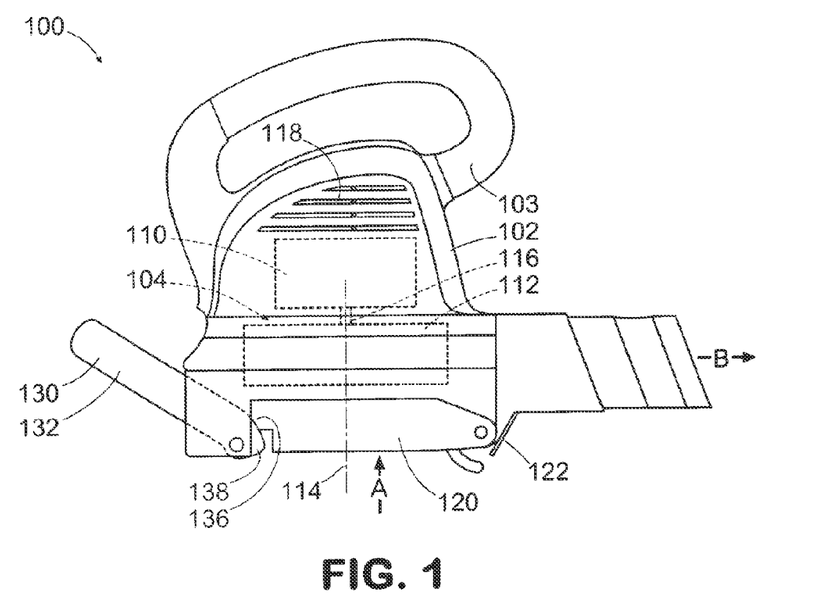
FIG. 1 is a schematic diagram of an embodiment of a blower device.
Figure 2:
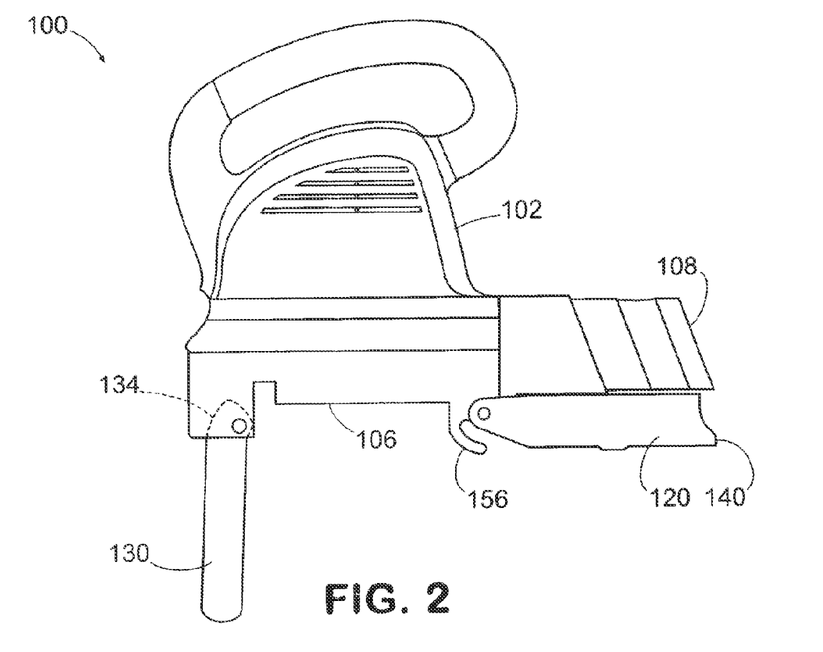
FIG. 2 is a schematic diagram of the device of FIG. 1, with the blower door retained in an open position for use in a vacuum mode.

In this regard, reference is made to the schematic diagram of FIG. 1, which depicts an exemplary embodiment of a blower device. As shown in FIGS. 1 and 2, device 100 includes a housing 102 with a handle 103. The housing defines an interior 104, an intake 106 and an exhaust 108. Both the intake and exhaust pneumatically communicate with the interior.

A motor 110 is mounted within the interior of the housing. The motor is operative to rotate an impeller 112 about a rotational axis 114 via a shaft 116. In this embodiment, the motor is electrically powered although other types of motors (e.g., gas powered motors) can be used. Vents (e.g., vent 118) formed in the housing provide cooling air for the motor.

A door 120 is mounted to the housing so that the door can pivot between a closed position (depicted in FIG. 1) and an open position (depicted in FIG. 2). In the closed position, the door covers the intake so that the device is configured for a blower mode of operation. In contrast, in the open position, the door is retained away from the intake so that the device is configured for a vacuum mode of operation. In this embodiment, a biasing member 122 (e.g., a spring) engages the door and the housing and is operative to urge the door toward the open position.

In operation, rotation of the impeller draws air inwardly into the interior through the intake (such as depicted by arrow A), with the air being expelled from the interior through the exhaust (such as depicted by arrow B, Note that regardless of the mode of operation, air is drawn into the intake and expelled from the exhaust. The primary difference in modes being that, in the vacuum mode, debris is not restricted by the closed door from entering the interior.

FIGS. 1 and 2 also depict a locking mechanism 130 (in this case, a locking handle) that is mounted to the housing. The locking mechanism movable (e.g., pivotable) between a locked position (depicted in FIG. 1) and an unlocked position (depicted in FIG. 2). The locking handle is an elongate member that includes a grip portion 132, which is located toward the distal end for grasping by a user to position the locking handle, and a cam 134, which is located at the proximal end adjacent to the axis of rotation of the locking handle. Notably, a first portion 136 of the cam is wider in a radial direction from the axis of rotation than the width of a second portion 138 of the cam. This configuration permits the first portion of the cam to interface with (e.g., form an interference fit with) components that are positioned adjacent to the proximal end of the locking handle.

When the locking handle is in the unlocked position (FIG. 2), the cam is positioned so that the door can be moved from the closed position to the open position. Additionally, when in the unlocked position, attachment of a vacuum tube assembly to the housing is facilitated, such as will be described with respect to FIGS. 3 and 4. When the locking handle is in the locked position (FIG. 1), a locking feature of the locking handle (e.g., a contact surface of the cam) forms an interference fit to selectively secure the door in the closed position. In the case of the door, the cam forms an interference fit with a flange 140 located at the distal end of the door. When the locking handle is in the locked position, the cam can alternatively secure a vacuum tube assembly to the housing.

Figure 3:
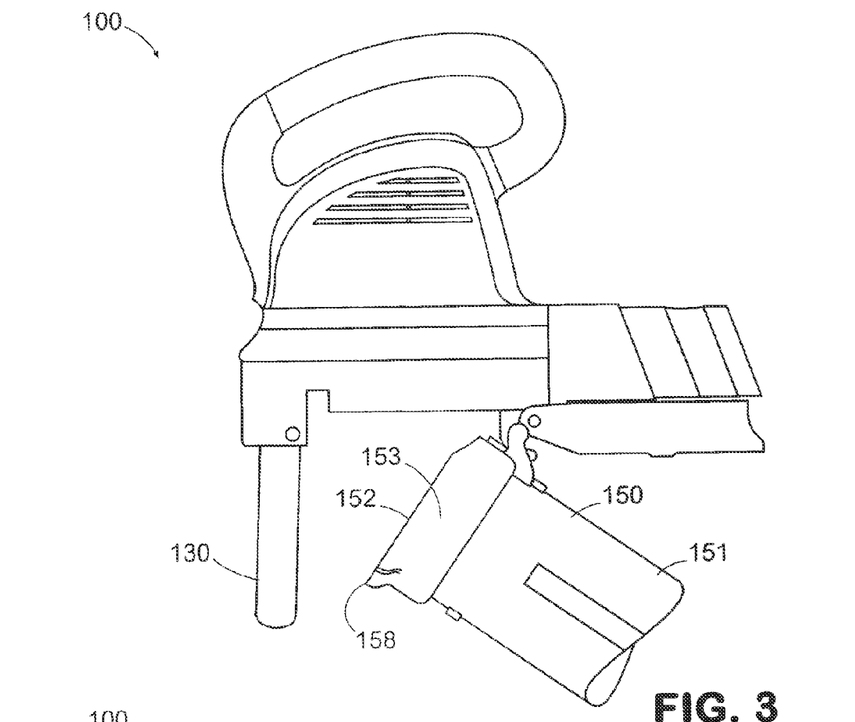
FIG. 3 is a schematic diagram of the device of FIGS. 1 and 2, with a vacuum tube assembly being installed.
Figure 4:
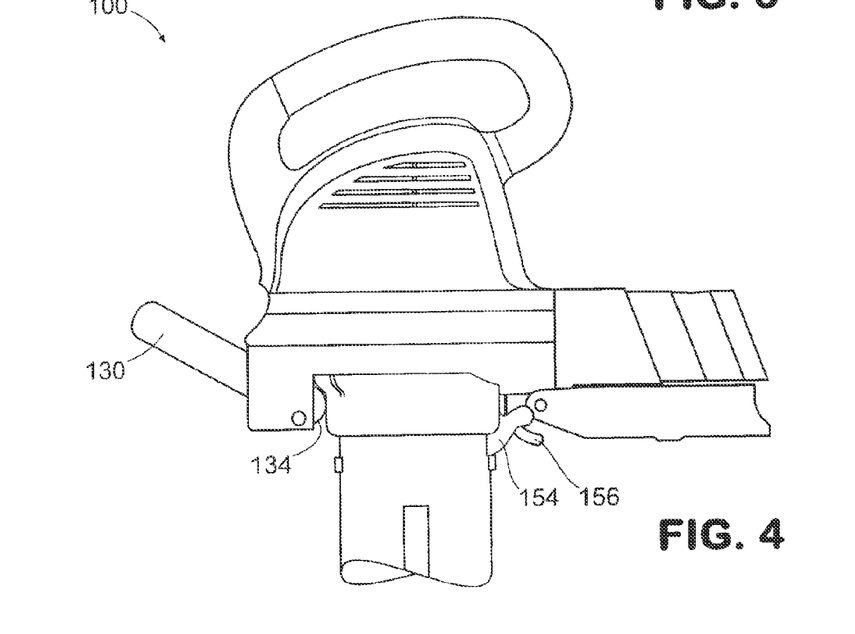
FIG. 4 is a schematic diagram of the device of FIGS. 1-3, with the locking handle moved to the locked position for locking the vacuum tube assembly to the intake.

In this regard, a portion of a vacuum tube assembly 150 is depicted in FIGS. 3 and 4. Specifically, vacuum tube assembly 150 of this embodiment includes a tube section 151 and a tube coupler 153, which functions as an interface between the tube section and the housing. It should be noted that a "vacuum tube assembly" refers to any number of configurations of such assemblies that creates an airflow passageway extending between an inlet end (not shown) and an outlet end 152. Such a vacuum tube assembly may optionally include one or more of various components such as tube sections and couplers, among others. Additionally, it should be noted that the term "tube" is not to be construed as limiting with respect to shape as various shapes (e.g., cross-sections) can be used.

Typically, in the vacuum mode of operation, the outlet end of the vacuum tube assembly is attached to the intake of the housing. As such, when converting from the blower mode of operation depicted in FIG. 1, the locking handle is moved to the unlocked position and the door is rotated to the open position. Then, as depicted in FIGS. 3 and 4, the vacuum tube assembly is installed.

Specifically, a coupler 154 mounted at the outlet end of the vacuum tube assembly engages a protrusion 156 extending outwardly from the housing. In this embodiment, the coupler 154 defines an aperture (not shown) into which the protrusion extends. Engagement of the protrusion and the coupler 154 forms a pivot location about which the outlet end of the vacuum tube assembly pivots to align with the intake of the housing. Once so aligned, the locking handle is moved to the locked position (FIG. 4), causing the cam of the handle to interfere with a protruding lip 158 of the tube coupler located at the outlet end of the vacuum tube assembly. This secures the vacuum tube assembly to the intake of the housing for use in the vacuum mode.

Figure 5:
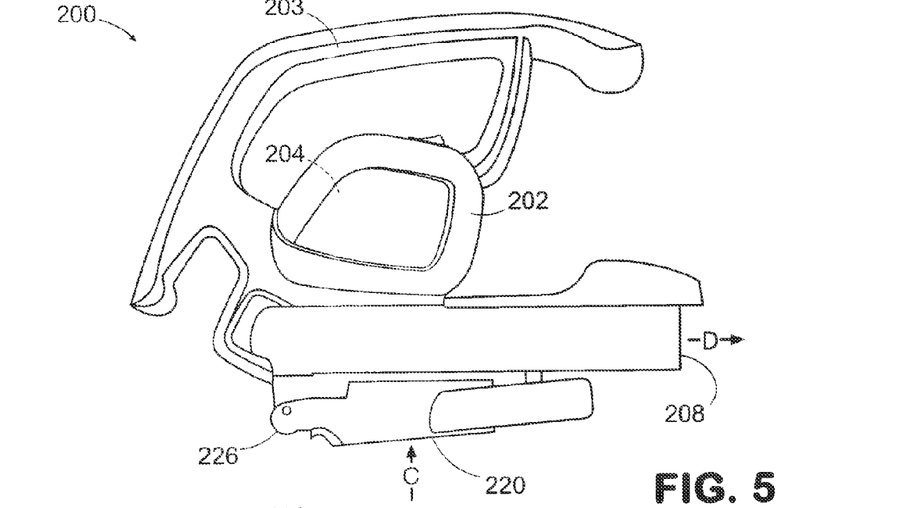
FIG. 5 is a schematic diagram of another embodiment of a blower device, with the vacuum door in a closed position for use in a blower mode.
Figure 6:
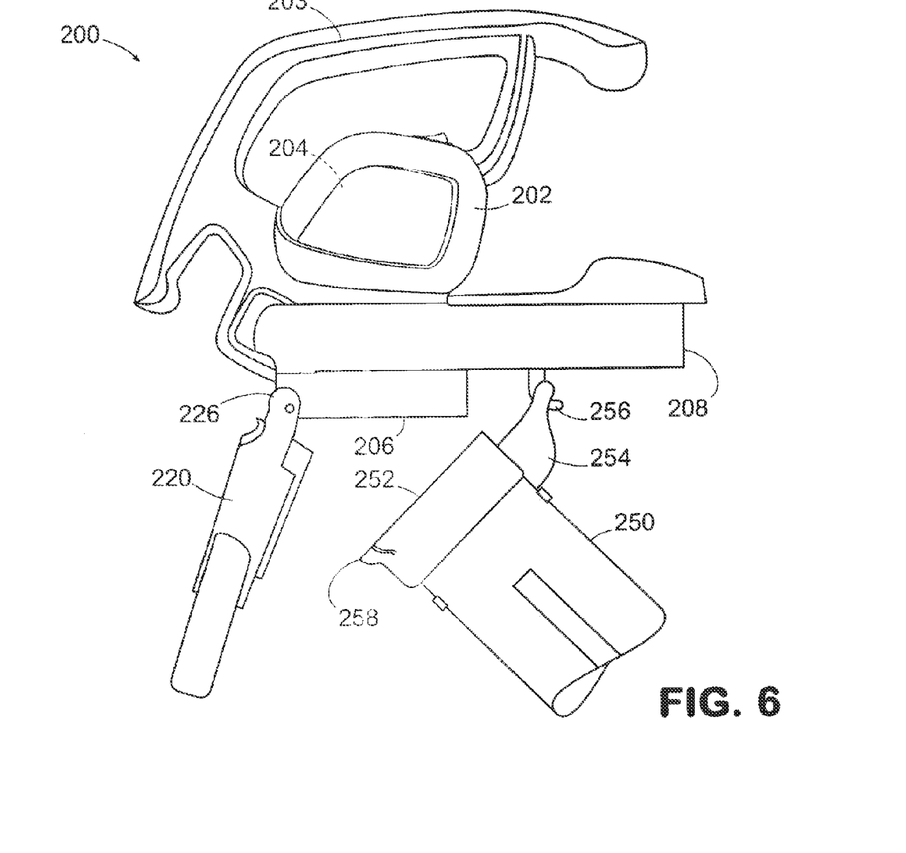
FIGS. 6 and 7 are schematic diagrams of the device of FIG. 5, showing a vacuum tube assembly being installed.

FIGS. 5-8 are schematic diagrams of another embodiment of a blower device. As shown in FIGS. 5 and 6, device 200 includes a housing 202 with a handle 203. The housing defines an interior 204, an intake 206 and an exhaust 208. Both the intake and exhaust pneumatically communicate with the interior.

A motor and impeller (not shown) are mounted within the interior of the housing. Additionally, a locking mechanism 220 (in this case, a door) is mounted to the housing, with the door being pivotable among an unlocked or closed position (depicted in FIG. 5), an intermediate position (depicted in FIGS. 6 and 7) and a locked or open position (depicted in FIG. 8). In the closed position, the door covers the intake so that the device is configured for a blower mode of operation. In contrast, in the open position, the door is retained away from the intake so that the device is configured for a vacuum mode of operation.

In operation, rotation of the impeller draws air inwardly into the interior through the intake (such as depicted by arrow C), with the air being expelled from the interior through the exhaust (such as depicted by arrow D).

As shown in FIGS. 5-8, the door incorporates a locking feature 226 that secures a vacuum tube assembly to the housing. In this embodiment, the locking feature is configured as a cam positioned at the proximal end of the door. Notably, a first portion 236 of the cam is wider in a radial direction from the axis of rotation than the width of a second portion 238 of the cam. This configuration permits the first portion of the cam to selectively interface with components that are positioned adjacent to the proximal end of the door.

Figure 7:
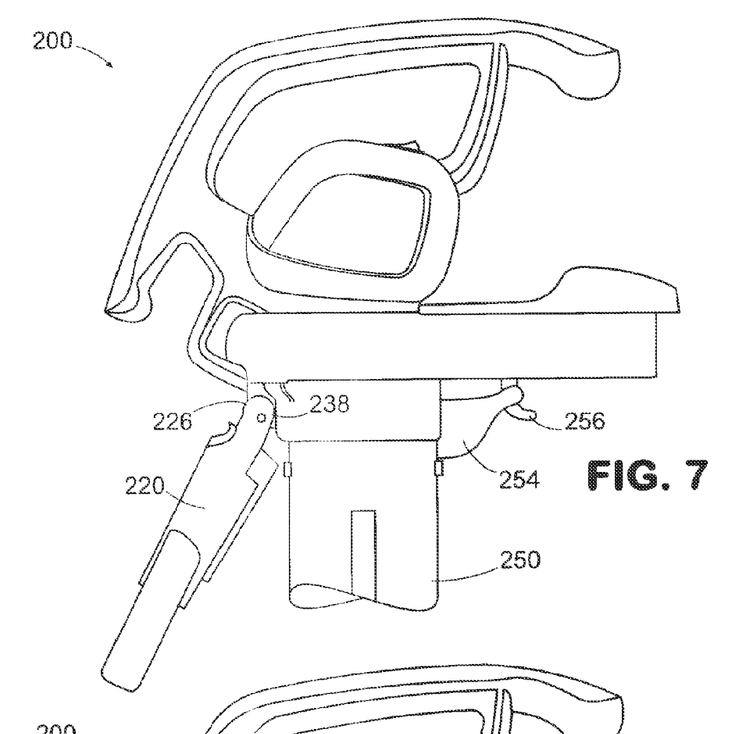
Figure 8:
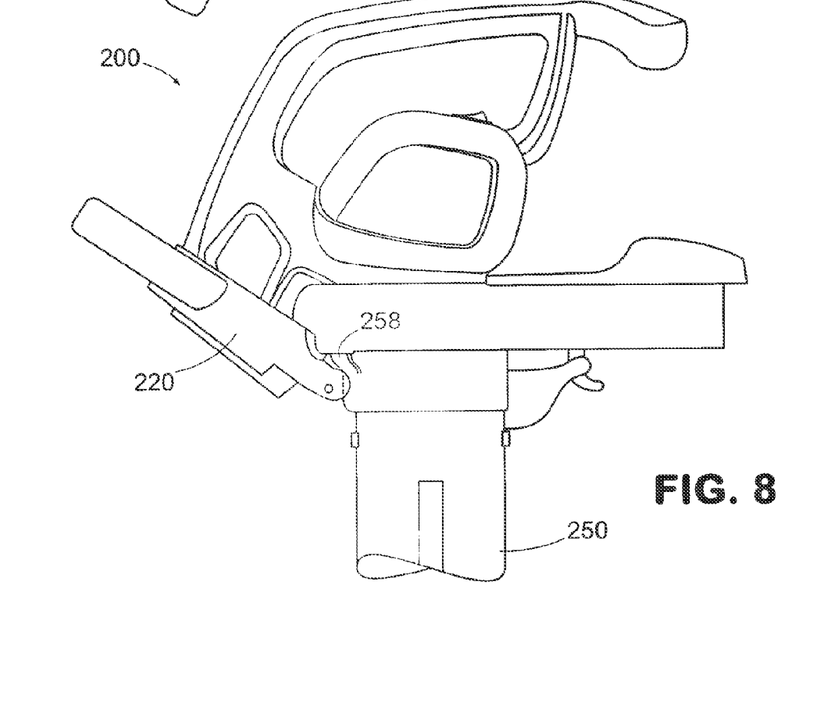
FIG. 8 is a schematic diagram of the device of FIGS. 5-7, with the vacuum door moved to the open position with a cam of the vacuum door locking the vacuum tube assembly to the intake.

When the door is in the intermediate position (FIG. 6), the cam is positioned so that attachment of a vacuum tube assembly to the housing is facilitated. In this regard, a portion of a vacuum tube assembly 250 is depicted in FIGS. 6-8. The vacuum tube assembly creates an airflow passageway that extends between an inlet end (not shown) and an outlet end 252. Typically, in the vacuum mode of operation, the outlet end of the vacuum tube assembly is attached to the intake of the housing. As such, when converting from the blower mode of operation depicted in FIG. 5 to the vacuum mode, the door is moved from the closed position to the intermediate position (also an unlocked position) so that the vacuum tube assembly can be installed (FIGS. 6 and 7). It should be noted that, in some embodiments, provisions can be included for selectively retaining the door in the intermediate position, such as a mechanical detent associated with the pivot function.

As shown in FIG. 6, a coupler 254 is mounted at the outlet end of the vacuum tube assembly for engaging a protrusion 256 that extends outwardly from the housing. In this embodiment, the protrusion is a generally J-shaped member, the distal end of which is directed toward the exhaust. Engagement of the protrusion and the coupler forms a pivot location about which the outlet end of the vacuum tube assembly pivots to align with the intake of the housing. Once so aligned, the door is moved from the intermediate position to the open position (FIG. 8), causing the cam of the door to interfere with a protruding lip 258 located at the outlet end of the vacuum tube assembly. This secures the vacuum tube assembly to the intake of the housing for use in the vacuum ode. It should be note that, in other embodiments, the positions of the coupler and protrusion could be interchanged.

In some embodiments, a door of a blower device (e.g., a door that functions as a locking mechanism) can be selectively retained in multiple positions. By way of example, device 300 of FIGS. 9 and 10 incorporates a latch 302 that is carried by door 304. The latch is configured to selectively engage latching member 306, which is positioned adjacent to the intake of the housing for retaining the door in the closed position, and latching member 308, which is spaced from the intake and positioned along an arc of travel of the latch for retaining the door in the open position.

Figure 9:
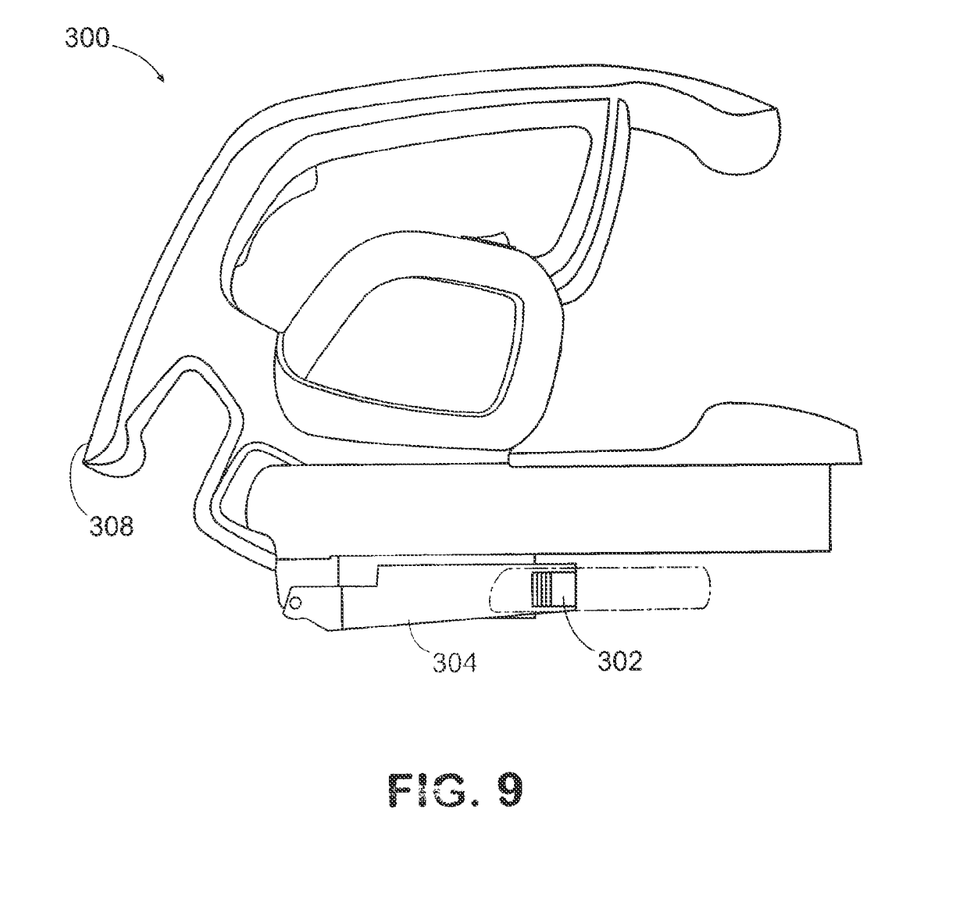
FIGS. 9 and 10 are schematic diagrams of another embodiment of a blower device.
Figure 10:
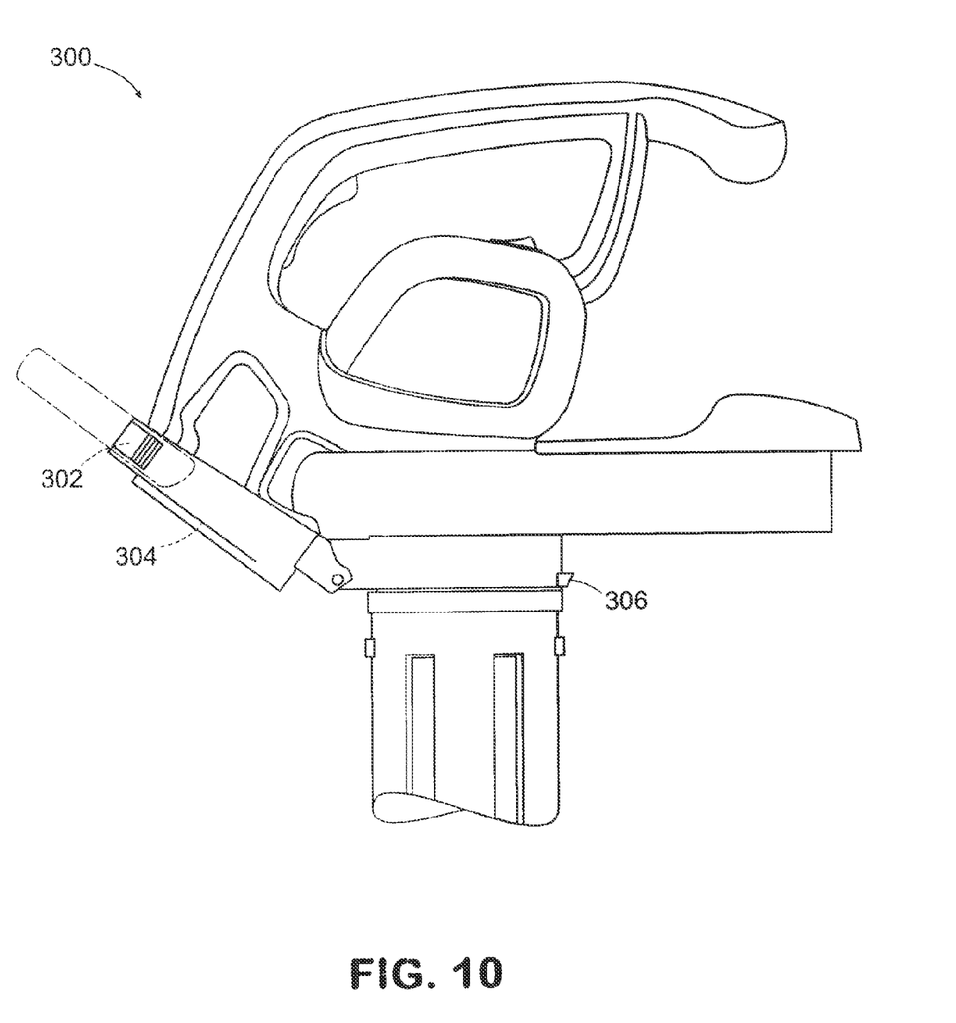

Note that in the embodiment of FIGS. 9 and 10, the handle of the door is shown in phantom lines to reveal the location of the latch, which is configured as a rotating latch.

Figure 11:
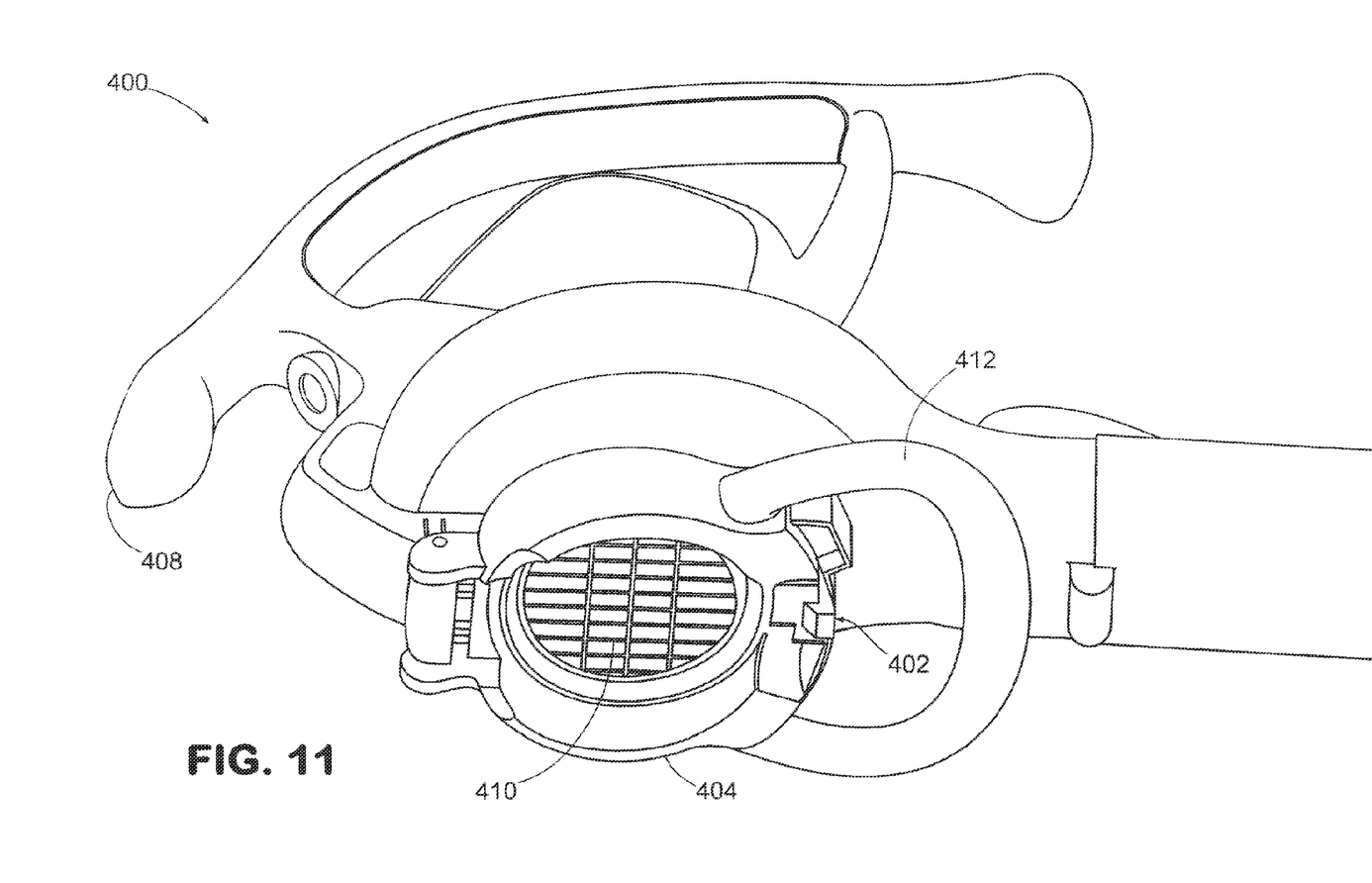
FIGS. 11 and 12 are schematic diagrams of another embodiment of a blower device.
Figure 12:
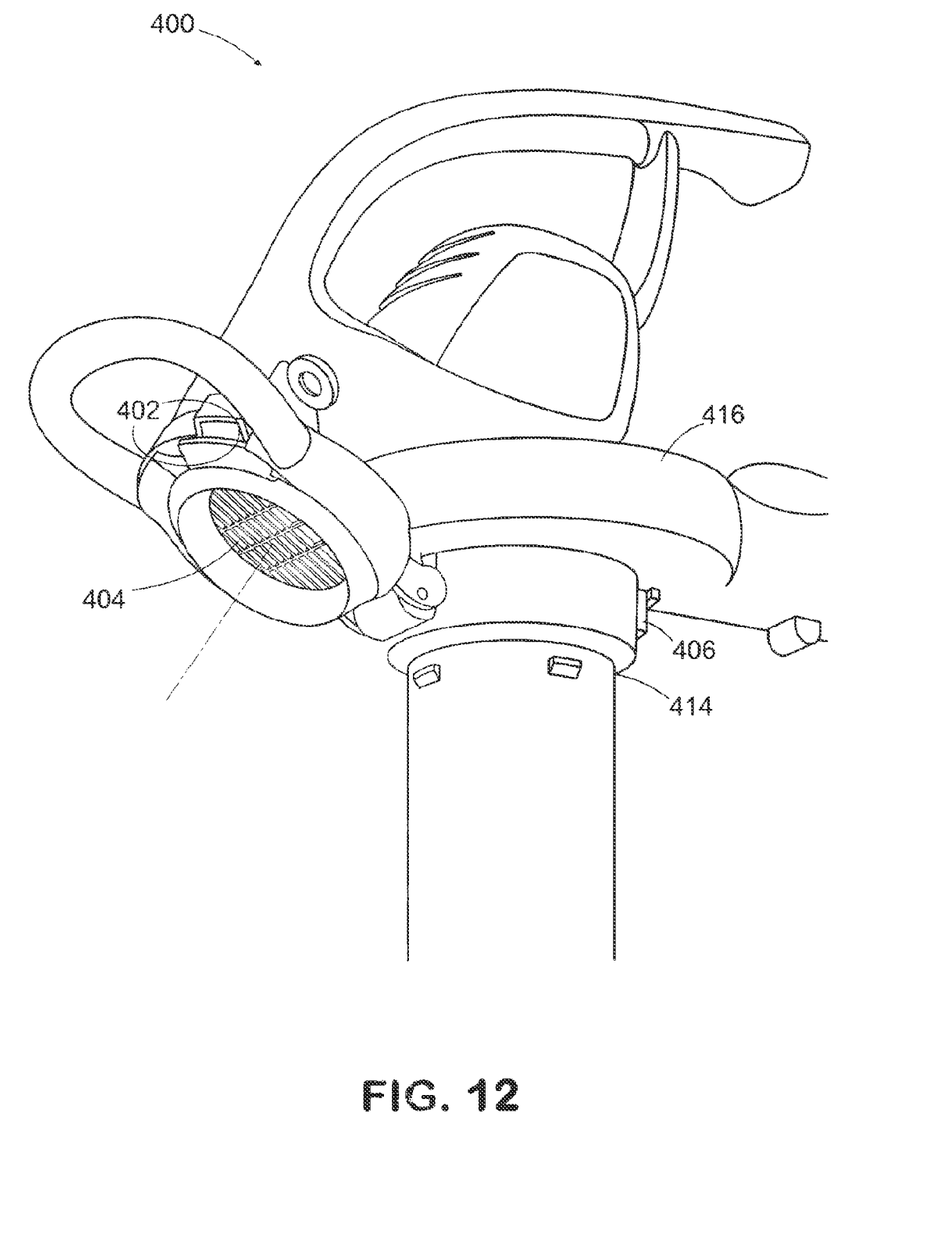

As another example, device 400 of FIGS. 11 and 12 incorporates a latch 402 that is carried by door 404. The latch is configured to selectively engage latching member 406, which is positioned adjacent to the intake of the housing for retaining the door in the closed position (FIG. 11), and latching member 408, which is spaced from the intake and positioned along an arc of travel of the latch for retaining the door in the open position (FIG. 12). Note that in the embodiment of FIGS. 11 and 12, the latch is configured as a cantilevered, pull-type latch.

FIGS. 11 and 12 also show detail of the door, which includes a circular inlet vent 410 and a loop handle 412. In this embodiment, the latch is positioned radially outboard of the inlet vent and within the inner perimeter defined by the loop handle. Note also that a vacuum tube assembly 414 is depicted attached to housing 416 in FIG. 12.

Figure 13:
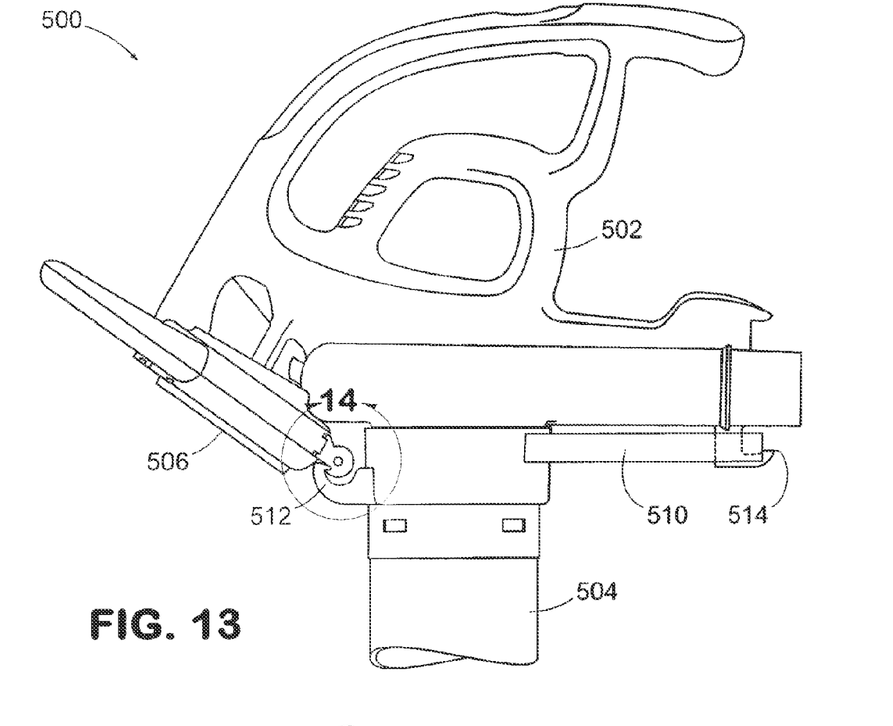
FIG. 13 is a schematic diagram of another embodiment of a blower device.

FIG. 13 is a schematic diagram of another embodiment of a blower device. As shown in FIG. 13, device 500 includes a housing 502 to which a vacuum tube assembly 504 is attached. Specifically, the vacuum tube assembly is attached to the intake of the housing, with a locking mechanism (in this case, a door) 506 being retained in an open position.

In this embodiment, retention of the vacuum tube assembly is facilitated by couplers 510 and 512, which are mounted to opposing sides of the outlet end of the vacuum tube assembly. Coupler 510 is configured to engage a protrusion 514 that extends outwardly from the housing. In contract, coupler 512 is configured to engage a catch 516 that is carried by a proximal end of the door.

Figure 14:
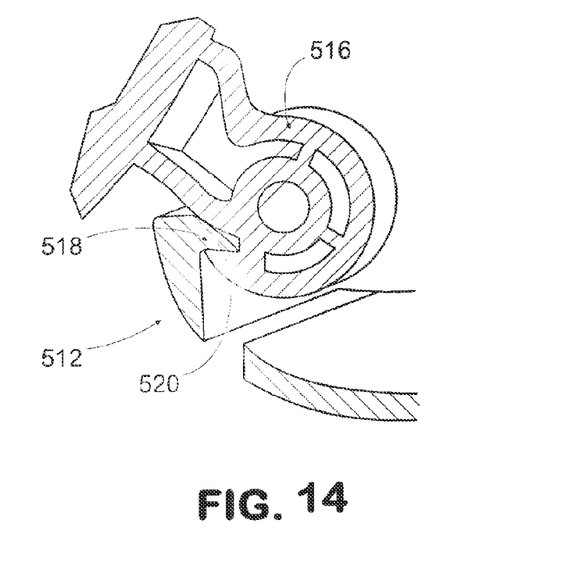
FIG. 14 is a cut-away, cross-sectional view of a coupler and catch from the embodiment of FIG. 13.

As shown in greater detail in the cut-away, cross-sectional view of FIG. 14, catch 516 includes a recess 518 that is sized and shaped to receive a protruding end 520 of coupler 512 when the door is rotated to the open position. Release of the vacuum tube assembly is facilitated by rotating the door to an intermediate position to disengage the protruding end of the coupler from the recess.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A hand-held blower device with vacuum function comprising:
    a housing defining an interior, an intake and an exhaust;
    an impeller mounted within the interior and being operative to rotate such that air is drawn into the interior through the intake and expelled from the interior through the exhaust;
    a locking mechanism including a door mounted to the housing, the door being movable among a closed position, in which the door covers the intake for a blower mode of operation, an intermediate position, and an open position, in which the door is positioned for a vacuum mode of operation, the locking mechanism being movable between an unlocked position and a locked position;
    a vacuum tube assembly having an inlet end and an outlet end and defining an air passageway between the inlet end and the outlet end, the outlet end being operative to engage the intake of the housing for the vacuum mode of operation; and
    a biasing member engaging the door and the housing, the biasing member being operative to urge the door toward the open position,
    the locking mechanism being operative to interface with the vacuum tube assembly to retain the outlet end of the vacuum tube assembly in engagement with the intake of the housing for the vacuum mode of operation.

2. The device of claim 1, wherein:
    the device further comprises a latch mounted to the door, and a first latching member positioned on the housing; and
    the latch is operative to selectively retain the door in the open position for the vacuum mode of operation by engaging the first latching member.

3. The device of claim 2, wherein:
    the device further comprises a second latching member positioned on the housing; and
    the latch is operative to selectively retain the door in the closed position for the blower mode of operation by engaging the second latching member.

4. The device of claim 1, wherein the door has a locking feature operative to form an interference fit with the vacuum tube assembly such that, when the door is in an intermediate position, the locking feature selectively enables engagement of the outlet end of the vacuum tube assembly with and removal from the intake of the housing, and when the door is in the open position, the locking feature retains the vacuum tube assembly in engagement with the housing.

5. The device of claim 4, wherein the door is a pivotable door.

6. The device of claim 5, wherein the locking feature is a cam positioned at a proximal end of the door.

7. The device of claim 5, wherein:
    the locking feature has a protrusion positioned at a proximal end of the door; and
    the vacuum tube assembly has a recess sized and shaped to receive the protrusion.

8. The device of claim 1, wherein the locking mechanism further comprises a locking handle mounted to the housing.

9. The device of claim 8, further comprising a door movable between a closed position, in which the door covers the intake for a blower mode of operation, and an open position, in which the door is positioned for a vacuum mode of operation.

10. The device of claim 1, wherein:
    the vacuum tube assembly has a first coupler mounted at the outlet end; and
    the housing has a first protrusion extending outwardly therefrom, the first protrusion being positioned such that engagement of the first protrusion with the coupler defines a pivot location about which the outlet end of the vacuum tube assembly pivots to align with the intake of the housing.

11. The device of claim 10, wherein:

the vacuum tube assembly has a second coupler mounted at the outlet end; and the locking mechanism, in the locked position, is operative to interface with the second coupler to retain the outlet end of the vacuum tube assembly in engagement with the intake of the housing for the vacuum mode of operation.

12. A hand-held blower device with vacuum function comprising:

a housing defining an interior, an intake and an exhaust;

an impeller mounted within the interior and being operative to rotate such that air is drawn into the interior through the intake and expelled from the interior through the exhaust;

a vacuum tube assembly having an inlet end and an outlet end and defining an air passageway between the inlet end and the outlet end, the outlet end being operative to engage the intake of the housing for the vacuum mode of operation;

a door pivotable between a closed position, in which the door covers the intake for a blower mode of operation, and an open position, in which the door is positioned for a vacuum mode of operation;

a biasing member engaging the door and the housing, the biasing member being operative to urge the door toward the open position;

a first latching member positioned on the housing; and a second latching member positioned on the housing;

the door having a latch operative to selectively retain the door in the open position for the vacuum mode of operation by engaging the first latching member and to selectively retain the door in the closed position for the blower mode of operation by engaging the second latching member.

13. The device of claim 12, wherein the door, in the open position, is operative to interface with the vacuum tube assembly to retain the outlet end of the vacuum tube assembly in engagement with the intake of the housing.

14. The device of claim 12, further comprising a locking mechanism mounted to the housing, the locking mechanism being movable between an unlocked position and a locked position, the locking mechanism being operative to interface with the vacuum tube assembly in the locked position to retain the outlet end of the vacuum tube assembly in engagement with the intake of the housing for the vacuum mode of operation.

* * * * *